Feb. 6, 1968  E. J. HUNTER  3,367,353
FERTILIZER DISPENSER FOR SPRINKLER SYSTEMS
Filed March 15, 1966  2 Sheets-Sheet 1
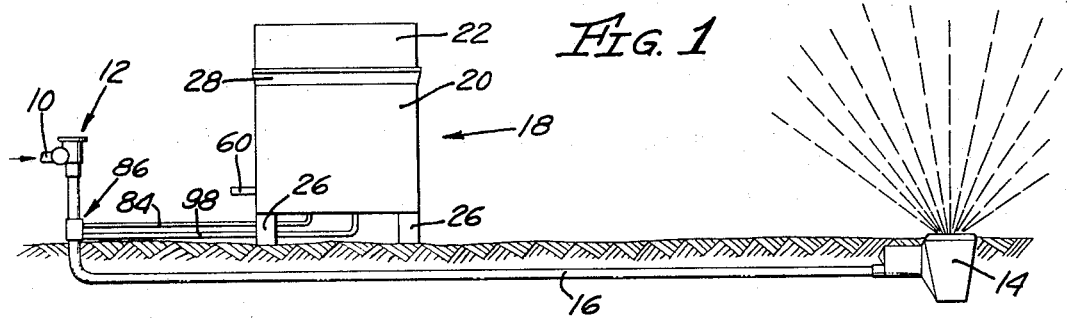
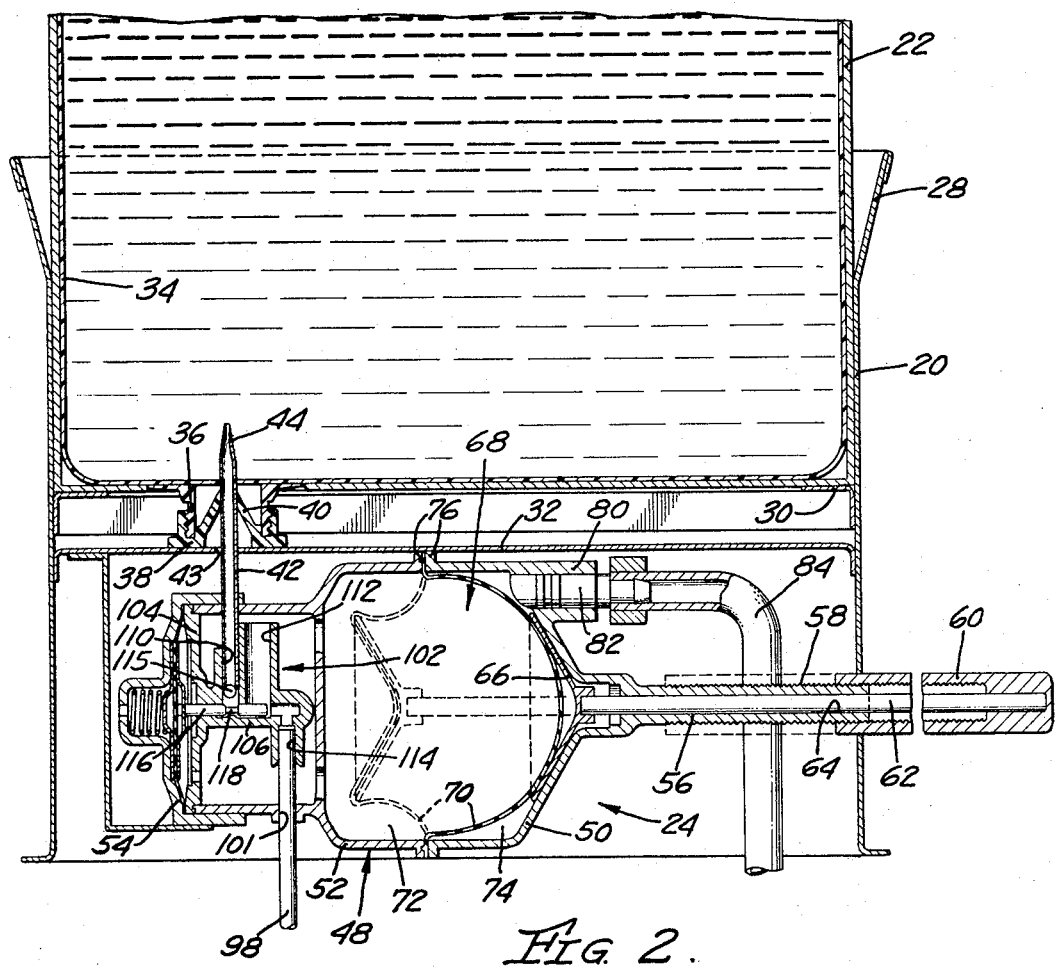
INVENTOR.
EDWIN J. HUNTER
BY Herbert E. Kidder
AGENT

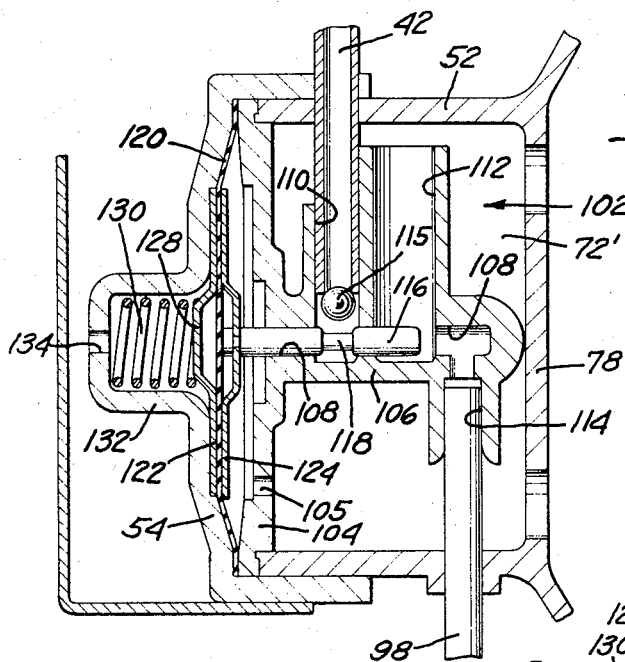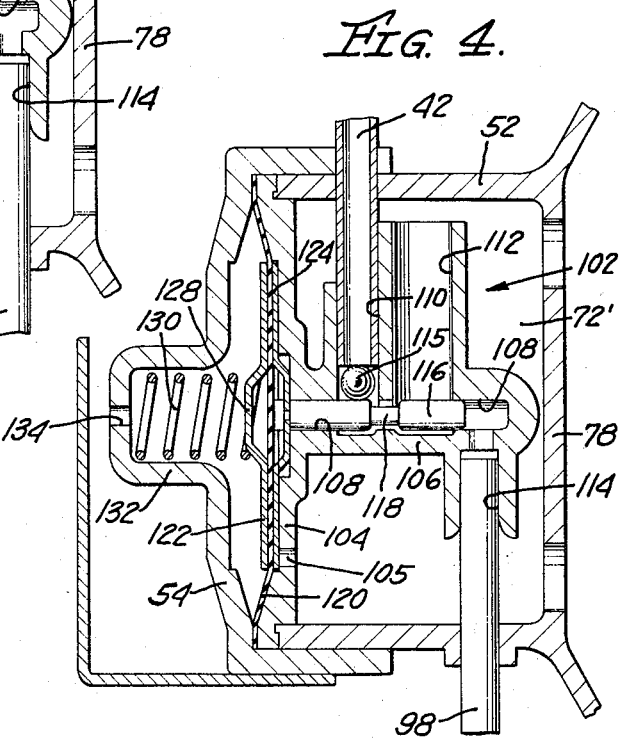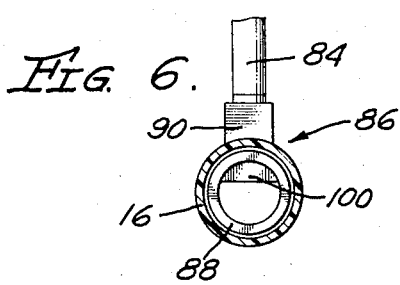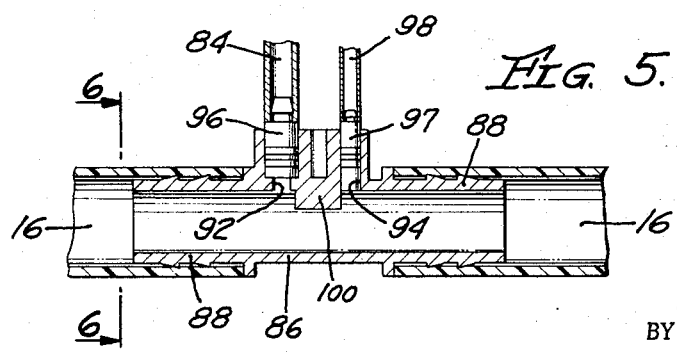

United States Patent Office 3,367,353
Patented Feb. 6, 1968

3,367,353
FERTILIZER DISPENSER FOR SPRINKLER SYSTEMS
Edwin J. Hunter, Riverside, Calif., assignor, by mesne assignments, to Toro Manufacturing Corporation, South Minneapolis, Minn., a corporation of Minnesota
Filed Mar. 15, 1966, Ser. No. 534,502
10 Claims. (Cl. 137—101.31)

ABSTRACT OF THE DISCLOSURE

Apparatus for injecting a small, measured quantity of liquid fertilizer into the irrigation water of an automatic sprinkler system each time that the system is turned on. The liquid is in a container and flows by gravity into a solution chamber when the system is shut off. A water-pressure-actuated valve closes off the container from the solution chamber and allows the liquid in the chamber to drain into the irrigation water pipe when the system is turned on. Water pressure acting against a flexible diaphragm in the solution chamber expels the liquid from the chamber.

---

The present invention relates to a fertilizer injector for dispensing fertilizer solution into an automatic sprinkler system, and is an improvement over the apparatus shown and described in my co-pending application, Ser. No. 391,239, filed Aug. 21, 1964, now Patent No. 3,292,867, issued Dec. 20, 1966.

The primary object of the present invention is to provide a new and improved apparatus for automatically dispensing a small, measured quantity of solution containing a high concentration of nitrogen, into the water line of a cyclically operated sprinkler system at the beginning of each irrigation cycle.

The idea of applying fertilizer through the sprinkler system is not new. It has been done commercially for some time on many agricultural crops and, to some extent, on larger turf installations. This method of application of fertilizer has several basic advantages over applying fertilizer by any other method. Probably the most important advantage is that the amount of fertilizer applied to any given area of ground is proportional to the amount of water received by that area.

No sprinkler system applies water uniformly to the ground over the entire area covered. As a matter of fact, the average sprinkler system may have as much as a 5 to 1 variation between the driest and wettest areas. If the fertilizer is applied by mixing it with the water and sending it through the sprinklers, the areas that receive the most water also receive the most fertilizer, which is as it should be. However, if the fertilizer is applied by a spreader, there will be variations in the distribution of the fertilizer just as there are in the distribution of the water, and the chances of the areas that receive the most fertilizer coinciding with the areas that receive the most water are remote. The result is that most areas of the lawn will receive far more fertilizer than they actually require if enough is applied to take care of the areas that receive the least. In other words, the inefficiency of the two systems is compounded, and the overall result is extremely inefficient.

Another disadvantage of applying fertilizer by other means is the danger of burning the turf with fertilizer solution of higher concentration than the plants can stand. If a heavy application of fertilizer is applied in an area where a small amount of water is supplied by the sprinklers, it is very likely that the burning of the turf will result, so that in addition to the very poor efficiency of utilization of fertilizer, there is also danger of damage to the turf.

An important advantage of applying the fertilizer through the sprinklers is the elimination of any manual labor. To the large commercial operator, this means zero labor cost, while to the home owner, it is a great convenience to be relieved of the labor of periodically spreading fertilizer on the lawn.

One of the biggest advantages of fertilization through sprinklers, however, is the frequency of application. It has been proven conclusively by numerous agricultural experimental stations and by commercial growers that frequent light applications of fertilizer are more efficient than infrequent heavy applications. This is particularly true of nitrogen, which is the major element required in fertilizer, and which is the most expensive ingredient. It has been shown that frequent light applications of nitrogen can reduce the amount required to less than fifty percent of that required by infrequent heavier applications. When this big improvement in efficiency is coupled with the greatly improved efficiency obtained by applying the fertilizer through the sprinklers, and thereby applying the fertilizer in accordance with the water distribution pattern, the net result is a very marked increase in efficiency, so much so that a 10-quart package of soluble fertilizer containing 20% nitrogen will be equivalent to 300 pounds of dry fertilizer applied by a fertilizer spreader in the conventional manner.

The above benefits apply mainly to the element nitrogen, as nitrogen in usable form is completely soluble and does not affix itself chemically to the soil. Therefore, any excess water quickly leaches out the nitrogen and drives it down into the ground below the root level. It is this characteristic of nitrogen that makes it so advantageous to apply it through the sprinklers and to apply it in small frequent doses rather than in large infrequent doses, and this method of application of the fertilizer can easily obtain a 3-fold increase in the efficiency of the use of nitrogen over other methods of application.

Another important object of the invention, therefore, is to provide an apparatus of the class described which dispenses the fertilizer solution into the water stream during the first two or three minutes of operation of the sprinklers. This is desirable so that the same amount of fertilizer will be injected whether the sprinklers are run three minutes or sixty minutes. The amount of fertilizer solution injected into the system is thus independent of the running time of the sprinklers, and the running time of the sprinklers can be adjusted upward or downward as the need for supplemental irrigation varies. The amount of irrigation required is, of course, dependent upon the amount of natural rainfall that the ground receives, and the running time of the sprinklers is therefore adjusted up or down to keep the total amount of water at the proper level. The requirements for nitrogen are fairly constant throughout the growing season, and the full amount of nitrogen should be applied, whether or not the full amount of irrigation water is needed. This requirement is well-met by the present invention.

Another object of the invention is to provide a fertilizer injector of the class described having means for adjusting the amount of fertilizer applied with each irrigation cycle independently of the running time of the sprinklers. The purpose of this adjustment is to enable the injector to be set to deliver the proper amount of fertilizer solution for the area covered by the sprinkler line to which it is connected.

A further object of the invention is to provide an apparatus of the class described, which is relatively insensitive to fluctuation in the water line, and which is operable over a water pressure range of from 6 to 60 p.s.i.

Another object of the invention is to provide an automatic fertilizer injector wherein the valve controlling the flow of fertilizer solution into the water line of the sprinkler system is closed by a relatively strong spring, and is opened by water pressure acting against a diaphragm of relatively large area, which overcomes the spring pressure. Thus, the valve is closed with considerable spring pressure, and is less likely to be cracked open by an undissolved crystal of fertilizer or other substance, or by a small particle of foreign material.

A further object of the invention is to provide a fertilizer injector which is so constructed that leakage of fertilizer solution into the sprinkler line is prevented. This is important, at any such leakage could cause the sprinkler line to fill with concentrated fertilizer solution which, when applied all at once, would result in burning of the turf.

Still a further object of the invention is to provide a fertilizer injector of the class described, wherein the fertilizer solution is contained within a non-refillable, disposable carton, which is merely set down into an open-top holder. The carton has a thin, sheet plastic bag on the inside, which serves as a water-tight liner to contain the solution. The sheet plastic bag has a soft, elastic cap of plastic or the like, which is pierced by a sharp-pointed feeder tube on the injector apparatus, and the cap then seals itself around the tube to prevent leakage. Solution flows by gravity down through the said feeder tube into the injector, where it is dispensed into the sprinkler system. Among the advantages of this arrangement are: (1) no mixing is required; (2) there is no danger of spilling concentrated fertilizer solution on the surrounding ground; (3) there is no evaporation or contamination of the contents; (4) the fertilizer solution can be controlled by the manufacturer to maintain uniformity of the constituents and optimum concentration for most effective use of the invention; and (5) since the plastic bag collapses as it empties, there is no need for an air vent in the container, which eliminates another possibility for contamination of the solution.

The foregoing and other objects and advantages of the present invention will become apparent to those skilled in the art upon consideration of the following detailed description of the preferred embodiment thereof, reference being had to the accompanying drawings, wherein:

FIGURE 1 is a ground elevational view, taken partially in section and partially in elevation, schematically showing a water sprinkler circuit including the fertilizer injector of the present invention;

FIGURE 2 is an enlarged vertical cross-section through the injector;

FIGURE 3 is a further enlarged, fragmentary sectional view through the valve body, showing the valve in its extreme left-hand position, as when the sprinkler system is turned on and there is water pressure in the valve body acting against the diaphragm;

FIGURE 4 is a view similar to FIGURE 3, showing the valve at its extreme right-hand position, as when the water pressure in the system is turned off;

FIGURE 5 is an enlarged, fragmentary sectional view through the water line of the sprinkler system at the point where the two pipes that actuate the fertilizer injector are connected thereto; and FIGURE 6 is a sectional view taken at 6—6 in FIGURE 5.

In the drawings, the reference numeral 10 designates a water supply pipe, which leads to a double valve assembly 12, having the function of preventing back-flow of sprinkler water into the water supply. The pipe 10 is connected to an automatic programming device (not shown) which turns the water on at predetermined times and operates the sprinklers for periods of time ranging from three to sixty minutes. The water supply pipe 10 is connected to sprinklers 14 by a water line 16 of flexible plastic pipe. Sprinkler head 14 may be of any desired type, the one depicted in FIGURE 1 being of the type shown and described in my co-pending application, Ser. No. 460,300, filed June 1, 1965.

Standing on the ground, preferably near the double valve assembly 12, is the fertilizer injector apparatus 18 with which the present invention is concerned. The apparatus 18 comprises an outer shell housing 20 of sheet metal, holding a carton 22 containing fertilizer solution. Mounted in the lower portion of the housing 20 below the carton 22 is the fertilizer injection mechanism 24. The housing 20 is a generally square, box-like structure, open at the top and preferably elevated above the ground by four legs 26 at the corners thereof. The top edge of the housing 20 is flared outwardly at 28 to facilitate insertion of the carton 22. Horizontally disposed angle irons 30 are fixed to the inside surfaces of the housing 21 about midway between the top and bottom edges thereof, and these form a shelf upon which the bottom edges of the carton rest. A short distance below the self 30 is a horizontal floor 32 of sheet metal, and the injection mechanism 24 is mounted on the underside thereof.

The carton 22 is preferably made of heavy cardboard or like material, and contained within it is a thin, sheet plastic bag 34, which serves as a waterproof liner for the carton. Stated more correctly, the bag 34 is a waterproof container for the liquid fertilizer solution, and the cardboard carton merely provides the necessary structural strength and rigidity. Containers of this type are widely used for packaging milk and other liquids, and are available at this time in 6 or 10-quart sizes. The bag 34 is usually a double polyethylene bag, and has an outlet fitting 36 fixed to the bottom side thereof, which projects through an opening in the bottom of the carton. The fitting 36 may be threaded in its outer surface to receive a screw-threaded closure 38, as shown in FIGURE 2, or the fitting and closure may be joined together more or less permanently, as by the use of interlocking serrations on the closure and fitting, or by welding the closure to the fitting after the bag has been filled.

Both the fitting 36 and the closure 38 are preferably made of polyethylene or similar plastic having a certain amount of pliability and elasticity. The closure 38 has a central, inwardly projecting, cone-shaped portion 40, the bottom of which is made with a zone of weakness, so that it may be pierced by a sharp-pointed feeder-tube 42. The feeder tube 42 is connected to the injector mechanism 24 and supplies fertilizer solution thereto. In one form of the invention shown in FIGURE 2, the feeder tube 42 is fixed to the injector mechanism 24 and projects upwardly therefrom, through a hole 43 in the floor 32. As the carton is lowered into the holder, the converging walls of the cone-shaped portion 40 guide the point of the feeder-tube 42 down into its center, and after the feeder-tube has pierced the bottom of the cone-shaped portion, the walls of the latter constrict around the feeder-tube to seal against leakage. The sharp-pointed end on the feeder-tube 42 may conveniently be formed by swaging the end of the tube at 44, so that it is tapered down to a point.

Alternatively, the feeder-tube 42 might be attached to one end of a relatively long plastic tube (not shown), the other end of which would be connected to the injector mechanism 24. The plastic tube would be made long enough so that the feeder-tube 42 could be inserted into the closure 38 while the container 22 is out of the housing 20, and the container could then be set down into the housing. This would have the advantage of allowing the container 22 to be exchanged at any time for another filled with a different solution, such as insecticide, fungicide, or the like, in case it should be necessary to apply the same to the turf instead of fertilizer. By making it possible to insert the feeder tube into the closure 38 while the carton 22 is right side up, the partially used cartons can be placed into the holder 20 or removed therefrom with the hole sealed by the feeder-tube 42, thereby preventing any loss of liquid while the container is upside down.

The fertilizer injector mechanism 24 is contained within a housing 48 consisting of three sections 50, 52 and 54, which are connected together as shown in FIGURE 2. Section 50 is generally cylindrical, with a conical bottom, terminating in a tubular sleeve 56, which extends to the right along the longitudinal axis of the housing. The outer surface of the sleeve 56 may be threaded at 58, as shown in FIGURE 2, to receive an internally threaded adjustment knob 60, that is fixed to the outer end of a rod 62. Rod 62 extends back through the central bore 64 of the sleeve 56 and is slidable therein. Rotatably mounted on the inner end of the rod 62 is a conical, cup-shaped head 66, the purpose of which is to regulate the volumetric capacity of the solution chamber, as will be explained presently. Alternatively, instead of a screw-threaded adjustment knob 60, the rod 62 could be made slidably adjustable within the sleeve 56, using any suitable friction means to restrain the rod against sliding too freely, once it has been adjusted.

The housing 48 encloses a chamber 68, which is divided by a thin flexible membrane 70 of rubber or rubber-like elastomer, into two separate compartments 72 and 74. The membrane 70 extends transversely across the housing 48, and its edges are clamped between opposed flanges 76 on the edges of sections 50 and 52. The membrane 70 is relatively loose and baggy within the housing, so that it can be stretched in one direction to bear against the bottom of section 50, or in the other direction to bear against an apertured partition member 78 extending transversely across the inside of the housing section 52 at some distance to the left of the flanges 76. The space 72' to the left of the partition member is considered to be part of the solution chamber, and is referred to as such in the claims.

Projecting endwise and to the right (as seen in FIGURE 2) from the top of housing section 50 is a tubular projection 80, and inserted therein is a hose coupling 82. The hose coupling 82 projects beyond the end of the tubular projection 80, and is inserted into the end of a plastic pipe 84. Pipe 84 extends down through the open bottom of the housing 20 and over to a pressure differential fitting 86, which is mounted in the line 16. The fitting 86 is a generally tubular member, having oppositely extending, serrated ends 88 that are pushed into the adjacent ends of the plastic line 16 and secured thereto in any suitable manner. Formed on one side of the fitting 86 is a boss 90 having two longitudinally-spaced bores 92 and 94 provided therein, into which are inserted tube couplings 96 and 97. Pipe line 84 is connected to coupling 96 on the upstream side of the fitting, while a second, slightly smaller pipe line 98 is connected to coupling 97 on the downstream side of the fitting. Projecting down into the central bore of the fitting 86 for about one-third of its diameter is a square-shouldered, transverse dam 100, the purpose of which is to produce a pressure differential between the upstream and downstream sides thereof. Since pipe line 84 is connected to the fitting on the upstream side of the dam 100, while pipe line 98 is connected on the downstream side, the pressure in pipe line 84 will be slightly higher than that in pipe line 98 when water is flowing through the line 16. Pressure carried by the line 84 is, of course, transmitted to the water chamber 74 in housing 48, where it bears against the membrane 70. Pipe line 98 extends up into the housing 20 and through an opening 101 in the bottom side of housing section 52, to a valve body 102 disposed within the chamber 72'.

Valve body 102 comprises a circular end plate 104 having an opening 105 provided therein, which is mounted on the end of housing section 52, inside of housing section 54. Mounted on the inner side of the end plate 104 and projecting inwardly therefrom is a body 106 having a horizontal, cylindrical bore 108 provided therein, which is intersected from the top by two upwardly extending vertical bores 110 and 112, and from the bottom at its outer end by a downwardly extending vertical bore 114. Pipe line 98 extends up into bore 114 and is tightly sealed thereto. Feeder-tube 42 extends down into bore 110, and at its bottom end is a ball check valve 115, the purpose of which is to prevent back-flow of water up into the plastic bag 34 when there is fluid pressure on the bottom side of the ball check valve. The central bore 112 extends up to a point just below the top side of housing section 52, and opens into the solution chamber 72'.

Slidably mounted within the bore 108 is a spool valve 116, having a short section 118 of reduced diameter near its midpoint, which is adapted to provide communication between bores 110 and 112 when the valve is shifted to the right, as shown in FIGURE 4. At the same time, the outer end of the valve 116 extends into the end portion of the bore 108, closing off the pipe 98 from communication with the solution chamber 72'.

When the valve 116 is shifted to the left, as shown in FIGURE 3, that portion of the horizontal bore 108 connecting the two vertical bores 110 and 112 is closed by the outer end of the valve, thereby sealing off the interior of the carton 22 from the solution chamber 72'.

The spool valve 116 is shifted between the two positions shown in FIGURES 3 and 4 by means of a spring-loaded diaphragm 120, which is attached to the left-hand end of the valve. The diaphragm 120 is a circular disk of thin, flexible, rubber or the like, which is clamped around its edges between the outer edges of the end plate 104 and the corresponding area of housing section 54. The central portion of the diaphragm is clamped between two opposed disks 122 and 124, and the latter is secured to the left-hand end of the valve 116, which projects beyond the end plate 104. The other disk 122 has a raised boss 128 at its center, and bearing at one end on this boss is a coil spring 130. The other end of the spring 130 seats on the bottom of a cylindrical, cup-like depression 132 in the center of housing section 54. There is a vent hole 134 in the bottom of the cup 132, which opens the interior of the housing 54 to atmospheric pressure. Thus, the left-hand side of diaphragm 120 is exposed to atmospheric pressure, while the right-hand side thereof is exposed to the fluid pressure in chamber 72', which is transmitted through the opening 105 in end plate 104.

When there is no water pressure in the line 16, the spring 130 presses the diaphragm 120 to the right against the end plate 104, as shown in FIGURE 4. This shifts the spool valve 116 over to the position shown, wherein feeder tube 42 is open to the solution chamber 72'. Fertilizer solution in the container 22 drains by gravity through the feeder tube 42, bore 110, reduced-diameter portion 118, and passageway 112 into the solution chamber 72', where it pushes the flexible membrane 70 to the right until the membrane lies against the head 66. Water in the water chamber 74 is forced out through the pipe 84 to the irrigation line 16.

The amount of fertilizer solution contained in the solution chamber 72 when the latter is full, depends upon the adjusted position of the head 66, which limits the distance that the membrane 70 can move to the right. With the head 66 at its extreme right-hand position, as shown in solid lines in FIGURE 2 the solution chamber 72 has a maximum volumetric capacity of the order of about 5 cubic inches. When the head 66 is adjusted inwardly to the minimum capacity position, as shown in broken lines, the capacity is of the order of 1.5 cubic inches.

When the water pressure is turned on in the sprinkler line 16, the dam 100 in fitting 86 causes a pressure differential on opposite sides of the dam, resulting in slightly higher pressure being transmitted through pipe 84 to the water chamber 74, than is transmitted through pipe 98 to the solution chamber 72, 72'. As soon as the pressure in chamber 72' rises above 5 p.s.i., the water pressure acting against the entire area of the diaphragm 120, causes the latter to shift to the left against the pressure of the spring 130, carrying the spool valve 116 with it to the position shown in FIGURE 3. In this position of the valve, the outlet pipe 98 is open to the solution chamber 72'.

Since the pressure in the water chamber 74 is slightly higher than that in the solution chamber 72, the membrane 70 is gradually pushed over to the left, expelling the fertilizer solution in chamber 72 out through the pipe 98 to the line 16, where it mixes with the irrigation water going to the sprinkler 14. Finally, the membrane 70 comes to rest against the partition member 78, and the expulsion of fertilizer solution ceases. The sprinkler system then continues to operate for the remainder of its programmed cycle, sending water only to the sprinkler 14. During the entire period that the water pressure is turned on and solution chamber 72, 72' is pressurized, the passageway to the feeder tube 42 is closed by the valve 116, so that water cannot backflow into the container 22.

When the programmer turns the water off in line 16 and the pressure falls to zero, the spool valve 116 is shifted to the right by the spring 130, closing the outlet to pipe 98 and opening the passageway between feeder tube 42 and bore 112. The solution in the container 22 then flows by gravity again into the solution chamber 72, pushing the membrane 70 ahead of it.

While I have shown and described in considerable detail what I believe to be the preferred form of the invention, it will be understood by those skilled in the art that various changes may be made without departing from the broad scope of the claims that follow.

I claim:

1. An injector for automatically dispensing a measured quantity of solution into an irrigation water line each time that the water is turned on, said injector comprising:
   a container holding a supply of solution to be dispensed;
   a housing enclosing a chamber;
   a flexible membrane dividing said chamber into two separate compartments, one of which constitutes a solution chamber and the other a water chamber;
   means connecting said irrigation water line to said water chamber, whereby the latter is filled with water under pressure each time that the water is turned on in said irrigation line;
   conduit means opening at one end into said container and at the other end into said solution chamber;
   a pipe connecting said solution chamber to said irrigation water line;
   a valve operable to control the flow of fluid in both said conduit means and said pipe, said valve being movable between a first position wherein said conduit means is closed and said pipe is open, and a second position wherein said conduit means is open and said pipe is closed;
   spring means urging said valve toward said second position;
   a diaphragm connected to said valve and arranged so that fluid pressure derived from the water pressure in said irrigation line can be applied to one side thereof so as to shift said valve to said first position against the pressure of said spring means;
   and means for pressurizing the water in said water chamber to a pressure level above that in said solution chamber, whereby said membrane is caused to move in the direction to expel fluid in said solution chamber through said pipe into said irrigation water line;
   said valve being returned by said spring means to said second position when the water is turned off in said irrigation line, thereby allowing a new charge of solution to flow from said container to said solution chamber through said conduit means, while said pipe is closed to prevent escape of solution in said solution chamber.

2. A solution injector as set forth in claim 1, wherein said container comprises a carton having a moisture-proof liner in the form of a bag made of thin sheet plastic, said bag having a closure of elastic material, and said injector including a holder into which said carton is placed with said closure at the bottom, said conduit means including a sharp-pointed feeder tube which is adapted to pierce said closure, said closure then sealing itself around said feeder-tube, and the liquid contents in said plastic bag being free to drain through said conduit means into said solution chamber under the control of said valve.

3. A solution injector as set forth in claim 1, wherein adjustable means is provided, which cooperates with said membrane to regulate the volumetric capacity of said solution chamber, said adjustable means comprising a rod passing through an opening in one wall of said housing and movable longitudinally therein, and a head mounted on the inner end of said rod, said head being engageable by said membrane to limit the movement of at least a portion thereof in one direction so as to restrict the volumetric capacity of said solution chamber, said rod being adjustable longitudinally with respect to said housing so as to regulate the volume of solution dispensed during each cycle of operation.

4. A solution injector as set forth in claim 1, wherein said valve is in the form of a spool slidably disposed within a cylindrical bore formed in a valve body constituting part of said housing, said conduit means and said pipe opening into said bore at longitudinally spaced points along the length thereof, said valve body having a passageway opening at one end into said solution chamber and at the other end into said bore between said pipe and said conduit means, said valve spool being movable between a first position wherein said conduit means is closed and said pipe is opened to said passageway, and a second position wherein said pipe is closed and said conduit means is opened to said passageway.

5. A solution injector as specified in claim 4, wherein said valve spool projects from one end of said valve body, said diaphragm being attached at its center to the projecting end of said valve spool and the outer edges of said diaphragm being connected to said valve body, said diaphragm being exposed on one side to the fluid pressure in said solution chamber and on the other side to atmospheric pressure.

6. A solution injector as specified in claim 5, wherein said spring means exerts pressure against said diaphragm on the atmospheric side thereof, said diaphragm having an area such that fluid pressure of the order of 5 p.s.i. will overcome the pressure of said spring means and shift said valve spool from said second position to said first position.

7. A solution injector as specified in claim 1, wherein said means for pressurizing the water in said water chamber comprises a second pipe opening at one end into said chamber and at the other end into said irrigation water line at a point where the water pressure is higher than at the point where said first-named pipe joins the water line.

8. A solution injector as specified in claim 1, wherein said means for pressurizing the water in said water chamber comprises a second pipe connected at one end to said water chamber and at the other end to said irrigation water line upstream of the point where said first-named pipe is connected thereto, and means for producing a pressure drop in the water line between the points where said second pipe and said first-named pipe are connected thereto.

9. A solution injector as specified in claim 1, wherein said housing has an apertured partition member in said solution chamber, said partition member being positioned to engage said flexible membrane so as to limit movement of the latter in the direction to expel fluid in said solution chamber.

10. A solution injector as specified in claim 9, wherein said housing includes a valve body disposed within said solution chamber on the side of said partition member opposite said membrane, said valve body having a bore formed therein, said conduit means and said pipe opening into said bore at longitudinally spaced points along the length thereof, said valve body having a passageway opening at one end into said solution chamber and at the other end into said bore between said pipe and said conduit means, said valve consisting of a spool valve slidable within said bore between a first position wherein said conduit means is closed and said pipe is opened to said passageway, and a second position wherein said pipe is closed and said conduit means is opened to said passageway, said means for pressurizing the water in said water chamber comprising a second pipe connecting said water chamber to said irrigation water line upstream of the point where said first-named pipe is connected thereto, and means in said water line between said second pipe and said first-named pipe for restricting the flow of water, thereby producing a pressure drop between said second pipe and said first-named pipe.

References Cited

UNITED STATES PATENTS 2,529,028 11/1950 Landon _____ 222—57
3,166,096 1/1961 Lang _____ 137—564.5

ROBERT B. REEVES, *Primary Examiner.*

K. N. LEIMER, *Assistant Examiner.*